(12) United States Patent
Liu

(10) Patent No.: US 9,973,012 B2
(45) Date of Patent: May 15, 2018

(54) ELECTRONIC CIGARETTE CHARGER

(71) Applicant: HUIZHOU KIMREE TECHNOLOGY CO., LTD. SHENZHEN BRANCH, Shenzhen, Guangdong (CN)

(72) Inventor: Qiuming Liu, Guangdong (CN)

(73) Assignee: HUIZHOU KIMREE TECHNOLOGY CO., LTD. SHENZHEN BRANCH, Shenzhen (CN)

( * ) Notice: Subject to any disclaimer, the term of this patent is extended or adjusted under 35 U.S.C. 154(b) by 0 days. days.

(21) Appl. No.: 15/125,976

(22) PCT Filed: Mar. 14, 2014

(86) PCT No.: PCT/CN2014/073477
§ 371 (c)(1),
(2) Date: Sep. 14, 2016

(87) PCT Pub. No.: WO2015/135218
PCT Pub. Date: Sep. 17, 2015

(65) Prior Publication Data
US 2017/0229888 A1    Aug. 10, 2017

(51) Int. Cl.
*H02J 7/00* (2006.01)
*A24F 47/00* (2006.01)

(52) U.S. Cl.
CPC ............ *H02J 7/0044* (2013.01); *A24F 47/00* (2013.01); *H02J 7/0052* (2013.01)

(58) Field of Classification Search
CPC .................................................. H02J 7/0044

USPC .......................................................... 320/115
See application file for complete search history.

(56) References Cited

U.S. PATENT DOCUMENTS

| | | | | |
|---|---|---|---|---|
| 2008/0042621 A1* | 2/2008 | Miglioranza | ......... | H02J 7/1407 320/150 |
| 2015/0102777 A1* | 4/2015 | Cooper | ................. | H02J 7/0042 320/114 |
| 2016/0204637 A1* | 7/2016 | Alarcon | ................ | A24F 47/008 320/114 |
| 2016/0233705 A1* | 8/2016 | Liu | ....................... | H02J 7/0044 |
| 2016/0233708 A1* | 8/2016 | Liu | ....................... | H02J 7/0042 |
| 2016/0249680 A1* | 9/2016 | Liu | ....................... | A24F 47/008 131/329 |
| 2016/0286857 A1* | 10/2016 | Liu | ....................... | A24F 47/008 |

(Continued)

*Primary Examiner* — Suresh Memula

(57) ABSTRACT

An electronic cigarette charger, comprising a housing, a charging circuit board, a first electric connecting piece and a second electric connecting piece, a first elastic metal wire, a second elastic metal wire, and a suspension structure arranged on the housing and used for suspending the electronic cigarette charger, wherein one end of the first elastic metal wire and the second elastic metal wire is connected to the charging circuit board in an insertion mode, the other end of the first elastic metal wire is connected to the first electric connecting piece in a buckling mode, and the other end of the second elastic metal wire is connected to the second electric connecting piece in a buckling mode. Therefore, the electronic cigarette charger is convenient to carry and to assemble by skillfully connecting the first elastic metal wire and the second elastic metal wire with remaining components, improving a production efficiency.

19 Claims, 7 Drawing Sheets

(56) References Cited

U.S. PATENT DOCUMENTS

| | | | | |
|---|---|---|---|---|
| 2016/0366933 A1* | 12/2016 | Liu | .......................... | A24F 15/18 |
| 2017/0013876 A1* | 1/2017 | Schennum | ............ | H02J 7/0044 |
| 2017/0027221 A1* | 2/2017 | Liu | ...................... | H02J 7/0044 |
| 2017/0175959 A1* | 6/2017 | Maglica | .................. | F21L 4/085 |
| 2017/0214261 A1* | 7/2017 | Gratton | ................. | H02J 7/0044 |
| 2017/0353591 A1* | 12/2017 | Abramovich | ....... | H04M 1/0262 |

* cited by examiner

ELECTRONIC CIGARETTE CHARGER

FIELD OF THE INVENTION

The present application relates to the field of daily electronic products, and more particularly relates to an electronic cigarette charger.

BACKGROUND OF THE INVENTION

An electronic cigarette charger is used to charge an electronic cigarette to increase an ability of endurance of the electronic cigarette. In the prior art, the electronic cigarette charger normally comprises a charge circuit board, and a first electric connecting piece and a second electric connecting piece which are connected to the electronic cigarette. Normally, the first electric connecting piece and the second electric connecting piece are respectively connected to the charge circuit board by welding conductive wires, welding operations are relatively inconvenient, thus it results in low production efficiency, and lead in a tin solder is easy to pollute the environment and cause harm to the human body. Secondly, a false welding is easy to produce when welding, resulting in a unreliable electric connection. Moreover, a common electronic cigarette charger is not provided with a suspension structure, thus, it is inconvenient to carry when using.

SUMMARY OF THE INVENTION

Technical problems which should be solved by the present application is to provide an electronic cigarette charger, which has advantages of a simple operation, a high production efficiency, a reliable electric connection, a convenient maintenance, a convenient carrying, and an advantageously environmental protection, aiming at the above defects.

The technical solutions of the present application for solving the technical problems is to provide an electronic cigarette charger, comprising a housing, a charging circuit board which is installed in the housing, a first electric connecting piece and a second electric connecting piece which are respectively and electrically connected to the charging circuit board and are used for electrically connecting to an electronic cigarette; wherein the electronic cigarette charger further comprises a first elastic metal wire, a second elastic metal wire, and a suspension structure arranged on the housing and used for suspending the electronic cigarette charger;

Wherein one end of the first elastic metal wire is detachably connected to the charging circuit board in an insertion mode, and the other end of the first elastic metal wire is connected to the first electric connecting piece in an elastic buckling mode; and one end of the second elastic metal wire is connected to the charging circuit board in an insertion mode, and the other end of the second elastic metal wire is connected to the second electric connecting piece in an elastic buckling mode.

In the electronic cigarette charger of the present invention, an annular groove is arranged on a peripheral surface of the first electric connecting piece; one end of the first elastic metal wire which is opposite to the charging circuit board is provided with a first buckling part which is arranged on and extended around the annular groove and is in an arc shape, the first buckling part is buckled inside the annular groove and is clamped on an inner wall of the annular groove.

In the electronic cigarette charger of the present invention, a limiting part which is in a convex shape is arranged at one end of the second electric connecting piece which is close to the charging circuit board; the second elastic metal wire is provided with a second buckling part which is in a U shape; the second buckling part is clamped on a circumferential surface of the second electric connecting piece and is abutted against the limiting part, an end of second buckling part is detachably connected to the charging circuit board in an insertion mode.

In the electronic cigarette charger of the present invention, the suspension structure is provided as either one of a suspension hole, a hook or a hanging ring which is arranged on the housing.

In the electronic cigarette charger of the present invention, the suspension hole is arranged at an end of the housing which is close to the first electric connecting piece.

In the electronic cigarette charger of the present invention, the suspension hole is a through hole, and two adjacent side surfaces of the housing are penetrated through by the suspension hole.

In the electronic cigarette charger of the present invention, a notch is defined at an edge of an end of the housing; an edge of the notch is provided with a switching mechanism; the notch and the switching mechanism constitute the suspension structure.

In the electronic cigarette charger of the present invention, the switching mechanism comprises a fixed arm which is fixedly defined at the edge of the notch, a movable arm which is rotationally mounted at the edge of the notch, and an elastic piece which is connected between the movable arm and the housing; the fixed arm and the movable arm can be staggered mutually or abutted against each other.

In the electronic cigarette charger of the present invention, the elastic piece is a torsion spring; one end of the torsion spring is fixed on the housing, and the other end of the torsion spring is fixed on the movable arm.

In the electronic cigarette charger of the present invention, the switching mechanism comprises two elastic arms which can be staggered mutually or abutted against each other; the elastic arms are defined at the edge of the notch.

In the electronic cigarette charger of the present invention, the first electric connecting piece is sleeved outside the second electric connecting piece.

In the electronic cigarette charger of the present invention, an end surface of the second electric connecting piece which is opposite to the charging circuit board is provided with a vent groove.

In the electronic cigarette charger of the present invention, the first electric connecting piece is an external threaded piece which is used for connecting to the electronic cigarette by a screw mode.

In the electronic cigarette charger of the present invention, the electronic cigarette charger further comprises an insulation piece which is sleeved between the first electric connecting piece and the second electric connecting piece.

In the electronic cigarette charger of the present invention, the housing comprises a first housing and a second housing which are detachably connected to each other; the charging circuit board is defined in an accommodation space which is formed by the first housing and the second housing.

In the electronic cigarette charger of the present invention, a buckling arm is convexly defined at a side edge of the first housing; a buckling groove which is connected with the buckling arm in a buckling mode is defined at a side edge of the second housing.

In the electronic cigarette charger of the present invention, the electronic cigarette charger further comprises a charging plug which is connected with the charging circuit board and is used for electrically connecting to an electrical power; the charging plug is a USB charging plug.

In the electronic cigarette charger of the present invention, the USB charging plug and the first electric connecting piece are respectively connected to two opposite ends of the charging circuit board.

In the electronic cigarette charger of the present invention, the suspension structure is a suspension hole which is arranged on the housing; the suspension hole is arranged at an end of the housing which is close to the first electric connecting piece, the suspension hole is a through hole, and two adjacent side surfaces of the housing are penetrated through by the suspension hole;

An annular groove is arranged on a peripheral surface of the first electric connecting piece; one end of the first elastic metal wire which is opposite to the charging circuit board is provided with a first buckling part which is arranged on and extended around the annular groove and is in an arc shape, the first buckling part is buckled inside the annular groove and is clamped on an inner wall of the annular groove;

A limiting part which is in a convex shape is arranged at one end of the second electric connecting piece which is close to the charging circuit board; the second elastic metal wire is provided with a second buckling part which is in a U shape; the second buckling part is clamped on a circumferential surface of the second electric connecting piece and is abutted against the limiting part, an end of the second buckling part is detachably connected to the charging circuit board in an insertion mode.

When implementing the electronic cigarette charger of the present application, the following advantageous effects can be achieved: the suspension structure arranged on the housing is adopted by the electronic cigarette charger, when users need to carry the electronic cigarette charger, a rope, a cable buckle or other items which is passed through the suspension structure can make the electronic cigarette charger attach to the rope, the buckle or other items, thereby facilitating the carrying. Secondly, structures of that the first elastic metal wire is connected to the charging circuit board and the first electric connecting piece in an insertion mode and a buckling mode respectively, and the second elastic metal wire is connected to the charging circuit board and the second electric connecting piece in an insertion mode and a buckling mode respectively are applied in the electronic cigarette, it is convenient and simple to operate when assembling, thereby a production efficiency of the electronic cigarette charger is relatively high, and avoiding the problem of false welding in the prior art, then the electrical connection is reliable, and it is convenient to maintain when damaged. Moreover, compared with the welding method in the prior art, the electronic cigarette charger can effectively avoid an environmental pollution and harms to human body, thereby being advantageous for an environment protection.

BRIEF DESCRIPTION OF THE DRAWINGS

The present application will be further described with reference to the accompanying drawings and embodiments in the following, in the accompanying drawings.

DETAILED DESCRIPTION OF THE PREFERRED EMBODIMENT

In order to solve the problems that, in the prior art of an electronic cigarette charger, a first electric connecting piece and a second electric connecting piece are normally connected to the charge circuit board by welding conductive wires, welding operations are inconvenient, thus it results in a low production efficiency, and lead in a tin solder is easy to pollute an environment and cause harm to human body, and commonly the electronic cigarette charger is not provided with a suspension structure, thus, it is inconvenient to carry when using, a main improvement of the present invention is that a suspension structure is arranged on a housing of the electronic cigarette charger. When users need to carry the electronic cigarette charger, a rope, a cable buckle or other items which is passed through the suspension structure can make the electronic cigarette charger attach to the rope, the buckle or other items, thereby facilitating the carrying. Secondly, as structures of that the first elastic metal wire is connected to the charging circuit board and the first electric connecting piece in an insertion mode and a buckling mode respectively, and the second elastic metal wire is connected to the charging circuit board and the second electric connecting piece in an insertion mode and a buckling mode respectively are applied in the electronic cigarette, it is convenient and simple to operate when assembling, thereby a production efficiency of the electronic cigarette charger is relatively high, and avoiding the problem of false welding in the prior art, then the electrical connection is reliable, and it is convenient to maintain when damaged. Moreover, compared with the welding method in the prior art, the electronic cigarette charger can effectively avoid an environmental pollution and harms to human body, thereby being advantageous for an environment protection.

To make the technical feature, objective and effect of the present application be understood more clearly, now the specific implementation of the present application is described in detail with reference to the accompanying drawings and embodiments.

Figure 1:
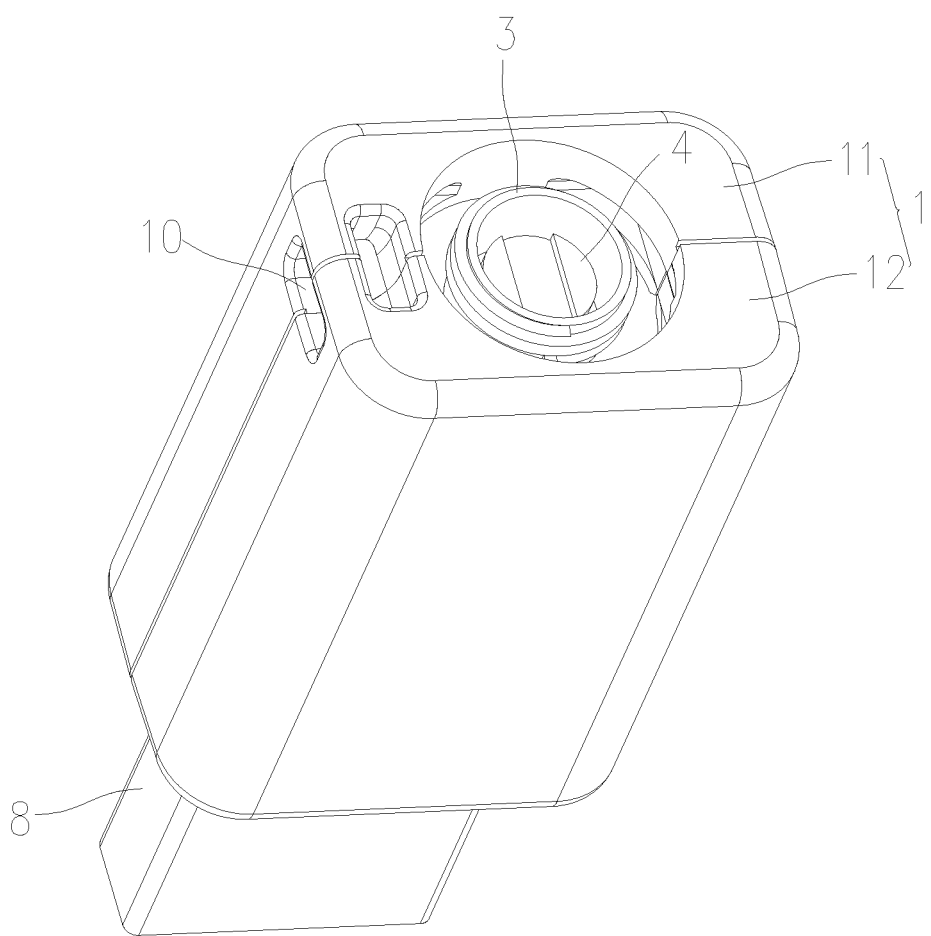
FIG. 1 is a structural schematic view of an electronic cigarette charger provided in a first preferred embodiment of the present application.
Figure 2:
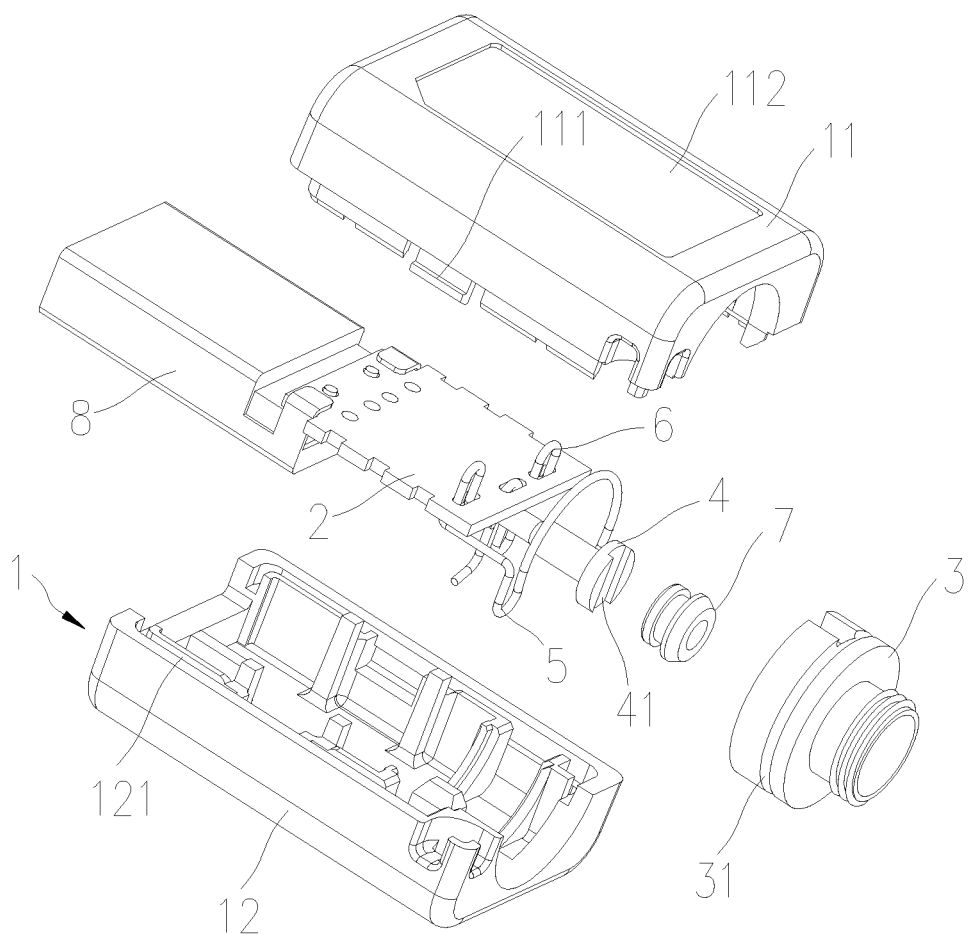
FIG. 2 is an explosion diagram of the electronic cigarette charger shown in FIG. 1.

As shown in FIG. 1 and FIG. 2, an electronic cigarette charger, which is provided by one of preferred embodiments of the present invention, comprises a housing 1, a charging circuit board 2, a first electric connecting piece 3, a second electric connecting piece 4, a first elastic metal wire 5, a second elastic metal wire 6, an insulation piece 7, a charging plug 8 and a suspension structure.

Specifically, the housing 1 is roughly a rectangular structure, the charging circuit board 2, the first electric connecting piece 3, the second electric connecting piece 4, the first elastic metal wire 5, the second elastic metal wire 6 and the insulation piece 7 are all installed inside the housing 1. The charging plug 8 is convexly defined at an end surface of the housing 1, the suspension structure is defined on an outside side surface of the housing 1. In the present embodiment, the housing 1 comprises a first housing 11 and a second housing 12 which are detachably connected to each other. Preferably, a structure of the first housing 11 is roughly the same with that of the second housing 12, a buckling arm 111 is convexly defined at a side edge of the first housing 11, the buckling arm 111 is generally a strip shaped convex structure. A buckling groove 121 which is connected with the buckling arm 111 in a buckling mode is defined at a side edge of the second housing 12, the buckling arm 111 and the buckling groove 121 are connected to each other in a buckling mode to realize a detachable connection between the buckling arm 111 and the buckling groove 121. In the present embodiment, both of two side edges of the first housing 11 are provided with the buckling arm 111, correspondingly, both of two side edges of the second housing 12 are provided with the buckling groove 121. In other embodiments of the present invention, a structure of a buckling groove is defined at a side edge of the first housing 11, correspondingly, a structure of a buckling arm is defined at a side edge of the second housing 12. A detachable connection between the first housing 11 and the second housing 12 can also be a threaded connection structure, etc. The housing 1 is not limited to the rectangular structure, it can be a sphere, a ellipsoid, a cylinder or other irregular shapes as well.

The suspension structure is used for suspending the electronic cigarette charger, the suspension structure is a suspension hole 10 which is arranged on the housing 1, the suspension hole 10 is a structure of a through hole, and is arranged at an end of the housing 1 which is close to the first electric connecting piece 3, and two adjacent side surfaces of the housing 1 are penetrated through by the suspension hole 10. By application of a structure of the suspension hole 10, when users need to carry the electronic cigarette charger, a rope, a cable buckle or other items which is passed through the suspension structure can make the electronic cigarette charger attach to the rope, the buckle or other items, thereby facilitating the carrying. In the present embodiment, the suspension hole 10 is defined at a connecting position of the first housing 11 and the second housing 12, it can also be understood as that edges of the first housing 11 and the second housing 12 are provided with slot structures (unlabeled), two slot structures form the suspension hole 10. In other embodiments of the present invention, the suspension hole 10 is defined at other positions of the housing, and the suspension hole 10 can penetrate through a same side surface as well. The suspension structure can also be provided as a hook (unlabeled) or a suspension ring (unlabeled), etc. the hook and the suspension ring is integrated with the housing 1 to increase a strength of a whole structure of the electronic cigarette charger.

The charging circuit board 2 is defined in an accommodation space which is formed by the first housing 11 and the second housing 12. The first electric connecting piece 3 and the second electric connecting piece 4 are connected to an end of the charging circuit board 2, the charging plug 8 is connected to an end of the charging circuit board 2 which is opposite to the first electric connecting piece 3. In this embodiment, preferably, a clamping part (unlabeled) is defined inside the first housing 11 and the second housing 12, correspondingly, a clamping groove (unlabeled) which is matched with the clamping part is defined on the charging circuit board 2. When assembly the charging circuit board 2, the clamping groove and the clamping part are buckled correspondingly, then the charging circuit board 2 can be detachably installed in the housing 1, and an assembling efficiency of the charging circuit board 2 is high.

Figure 5:
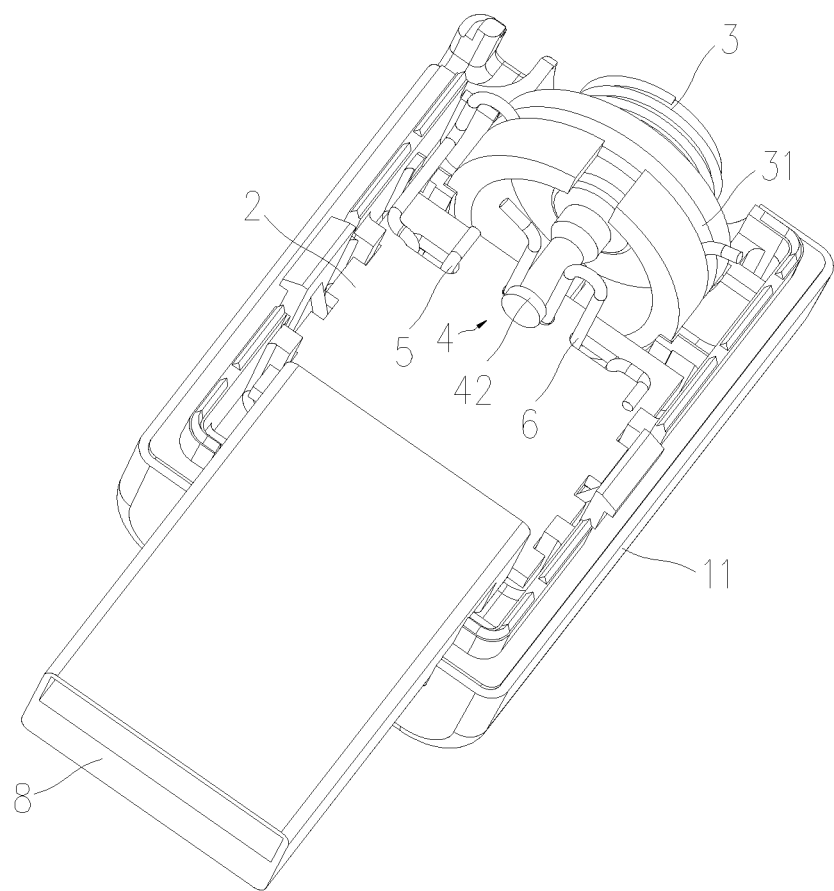
FIG. 5 is a structural schematic view of the electronic cigarette shown in FIG. 1 without a second housing.

As illustrated by FIG. 2 and FIG. 5, the first electric connecting piece 3 and the second electric connecting piece 4 are respectively used for being electrically connected to the electronic cigarette (unlabeled) to realize a chargeable connection between the electronic cigarette charger and the electronic cigarette. The first electric connecting piece 3 is an external threaded piece which is used for connecting to the electronic cigarette by a screw mode, the external threaded piece is a hollow structure, the first electric connecting piece 3 is sleeved outside the second electric connecting piece 4. In order to improve a stability of an electrical connection between the first electric connecting piece 3 and the first elastic metal wire 5 and to facilitate an assembly, preferably, an annular groove 31 is arranged on a peripheral surface of the first electric connecting piece 3, the first elastic metal wire 5 is elastically buckled inside the annular groove 31.

The second electric connecting piece 4 is roughly a cylindrical structure, an end surface of the second electric connecting piece 3 which is opposite to an end surface of the charging circuit board 2 is provided with a vent groove 41, the vent groove 41 penetrates through a sidewall of the second electric connecting piece 4. By applying a structure of the vent groove 41, when charging for the electronic cigarette, it can effectively avoid that a big airflow is generated during the electronic cigarette charger is connected to the electronic cigarette and then results in that an airflow sensor in the electronic cigarette generates an action, so as to prevent a false triggering of the electronic cigarette working. A limiting part 42 which is in a convex shape is arranged at one end of the second electric connecting piece 4 which is close to the charging circuit board 2, the second elastic metal wire 6 is elastically buckled and abutted against the limiting part 42. An insulation piece 7 is generally a ring structure, and is sleeved between the first electric connecting piece 3 and the second electric connecting piece 4 to release an electrical insulation between the two.

Figure 3:
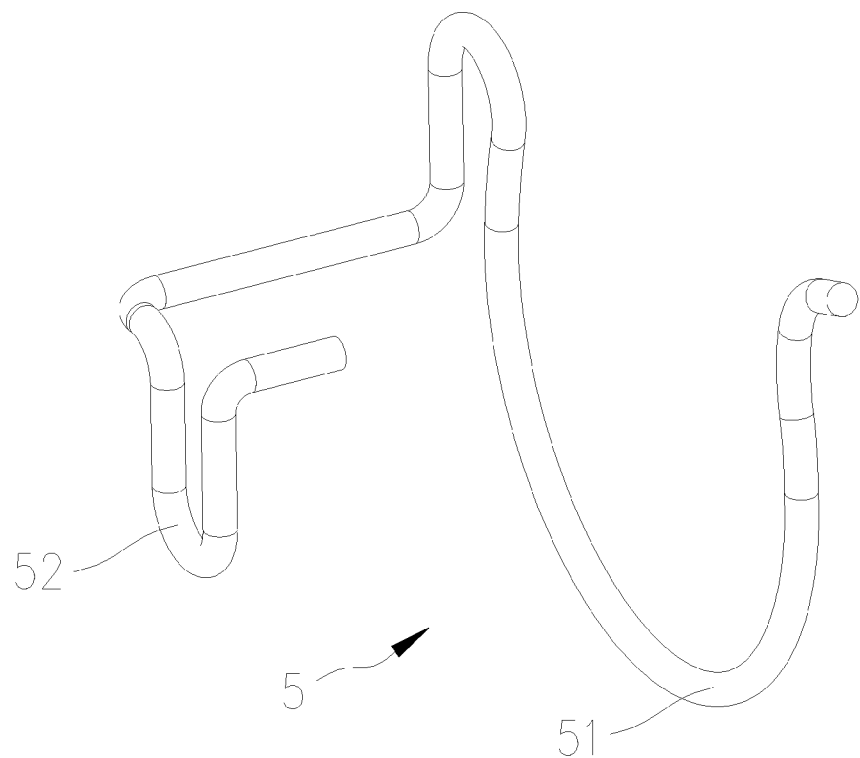
FIG. 3 is a structural schematic view of a first elastic metal wire of the electronic cigarette shown in FIG. 1.

As shown in FIG. 3 with referring to FIG. 2 and FIG. 5, the first elastic metal wire 5 is used to release an electrical connection between the first electric connecting piece 3 and the charging circuit board 2. One end of the first elastic metal wire 5 which is opposite to the charging circuit board 2 is provided with a first buckling part 51, and the other end of the first elastic metal wire 5 is provided with a first inserting part 52. The first buckling part 51 is in an arc shape and is arranged on and extended around the annular groove 31, the first buckling part 51 is buckled inside the annular groove 31 and is clamped at an inner wall of the annular groove 31 to release an electrical connection with the first electric connecting piece 3. The first inserting part 52 is roughly a U shape, and can be detachably connected on the charging circuit board 2 in an insertion mode to release an electrical connection with the charging circuit board 2. Preferably, an end of the first elastic metal wire 5 which is buckled with the first electric connecting piece 3 is a ring structure, the ring structure is clamped inside the annular groove 31 to ensure a connection between the first elastic metal wire 5 and the first electric connecting piece 3 is more reliable.

Figure 4:
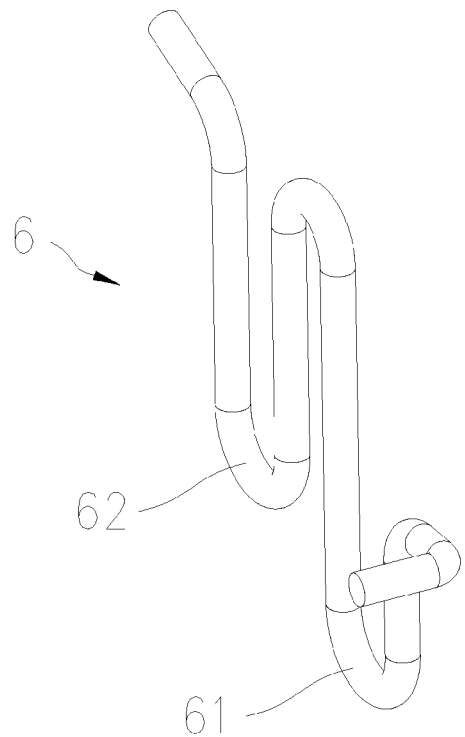
FIG. 4 is a structural schematic view of a second elastic metal wire of the electronic cigarette shown in FIG. 1.

As shown in FIG. 4 with referring to FIG. 2 and FIG. 5, the second elastic metal wire 6 is used to release an electrical connection between the second electric connecting piece 4 and the charging circuit board 2. One end of the second elastic metal wire 6 is provided with a second buckling part 61, and the other end of the second elastic metal wire 6 is provided with a first inserting part 62. The second buckling part 61 is in a U shape and is clamped on a circumferential surface of the second electric connecting piece 4 and is elastically buckled with and abutted against the limiting part 42 to release an electrical connection with the second electric connecting piece 4. The second inserting part 62 is roughly a U shape, and an end of the second inserting part 62 can be detachably connected on the charging circuit board 2 in an insertion mode to release an electrical connection with the charging circuit board 2.

By applying the above structures of the first elastic metal wire 5 and the second elastic metal wire 6, it is convenient and simple when assembling the electronic cigarette charger, thus an efficiency of producing the electronic cigarette charger is relatively high; secondly, as the first elastic metal wire 5 and the second elastic metal wire 6 are detachably connected inside the electronic cigarette charger, thereby it is simple and easy to remove them, and convenient to replace when maintaining; moreover, compared with the welding method in the prior art, the electronic cigarette charger can effectively avoid an environmental pollution and harms to human body, thereby being advantageous for an environment protection.

The charging plug 8 is used for electrically connecting to a power supply, the charging plug 8 is connected to the charging circuit board 2. In the present embodiment, the charging plug 8 is a USB charging plug, it can be electrically connected to a USB main joint interface of an electric power. The charging plug 8 is fixedly connected to the charging circuit board 2. In other embodiments of the present invention, the charging plug 8 can be retractably or rotationally arranged on the housing 1.

By applying the electronic cigarette charger which is provided by the above embodiment, as the suspension structure which is arranged on the housing is adopted by the electronic cigarette charger, when users need to carry the electronic cigarette charger, a rope, a cable buckle or other items which is passed through the suspension structure can make the electronic cigarette charger attach to the rope, the buckle or other items, thereby facilitating the carrying. Secondly, that structures of the first elastic metal wire and the second elastic metal wire are applied in the electronic cigarette makes it is convenient and simple to operate when assembling, thereby a production efficiency of the electronic cigarette charger is relatively high, and avoiding the problem of false welding in the prior art, then the electrical connection is reliable, and it is convenient to maintain when damaged. Moreover, compared with the welding method in the prior art, the electronic cigarette charger can effectively avoid an environmental pollution and harms to human body, thereby being advantageous to an environment protection.

Figure 6:
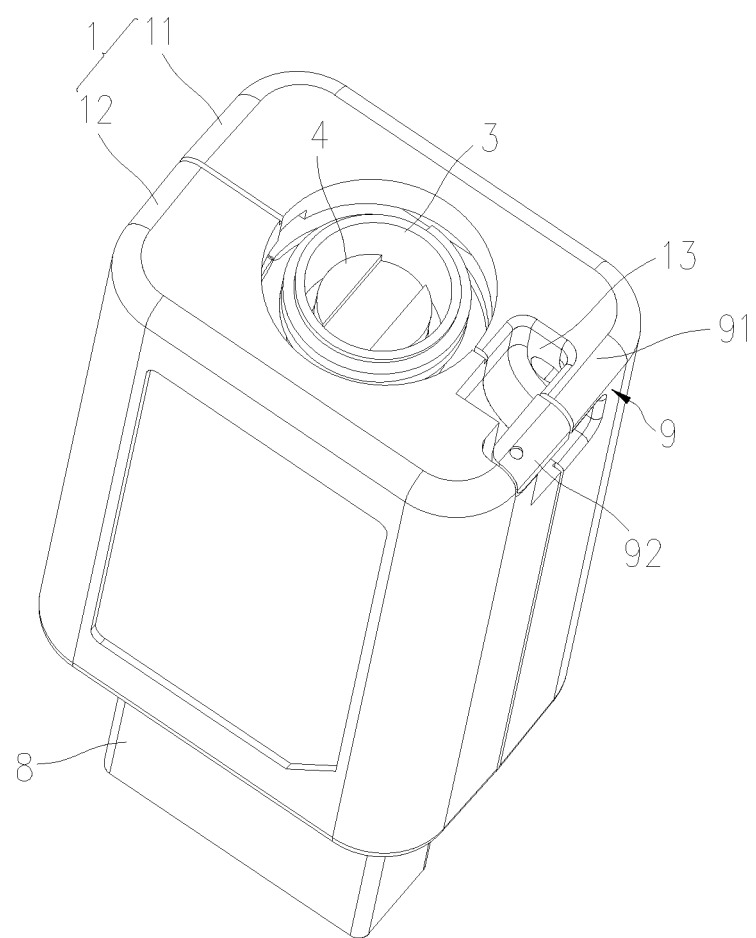
FIG. 6 is a structural schematic view of an electronic cigarette charger provided in a second preferred embodiment of the present application.
Figure 7:
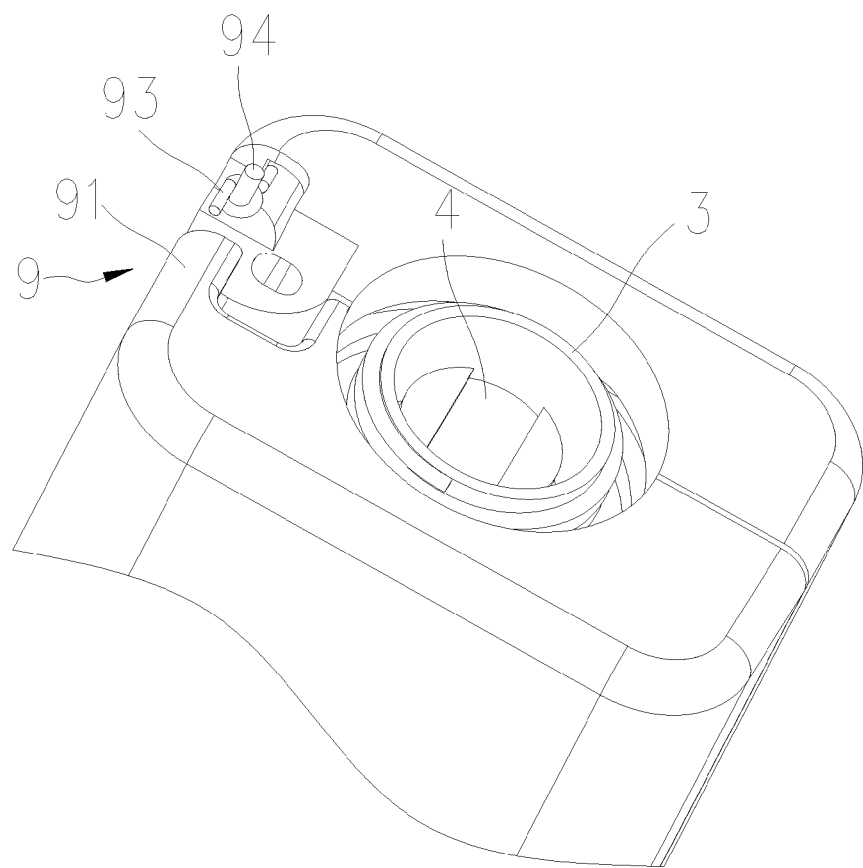
FIG. 7 is a sectional view of the electronic cigarette shown in FIG. 6 without a movable arm.
Figure 8:
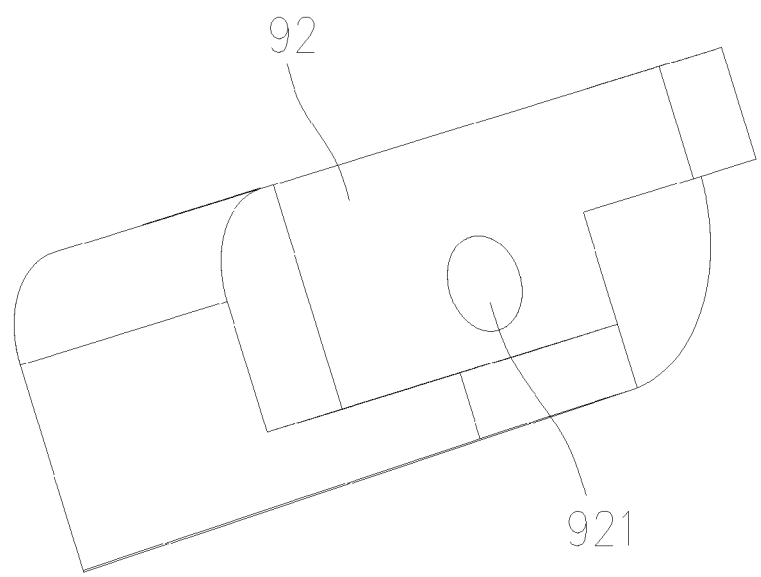
FIG. 8 is a structural schematic view of the movable arm of the electronic cigarette shown in FIG. 6.

As illustrated by FIG. 6, FIG. 7 and FIG. 8, a second preferred embodiment of the present invention is provided with an electronic cigarette charger, a difference from the electronic cigarette charger which is provided by the first preferred embodiment is the suspension structure. In the present embodiment, a notch 13 is defined at an edge of an end of the housing 1; an edge of the notch 13 is provided with a switching mechanism 9; the notch 13 and the switching mechanism 9 constitute the suspension structure together. The switching mechanism 9 is used for releasing an open and a close of the suspension structure, when the electronic cigarette charger is needed to be carried, open the switching mechanism 9, then the rope or the cable buckle is passed through the switching mechanism 9 and placed in the notch 13, after that, close the switching mechanism 9 to ensure the rope or the cable buckle is clamped in the notch 13, so as to enable the electronic cigarette charger is attached on items such as the rope or the cable buckle, thereby facilitating the carrying.

In this embodiment, the switching mechanism 9 comprises a fixed arm 91, a movable arm 92, an elastic piece 93 and a fixed axis 94. The fixed arm 91 is fixedly defined at the edge of the notch 13, the movable arm 92 is rotationally mounted at the edge of the notch 13, structures of the fixed arm 91 and the movable arm 92 are generally the same, both of them has a long strip structure. The fixed arm 91 and the movable arm 92 are defined oppositely, when rotate the movable arm 92, the movable arm 92 and the fixed arm 91 are staggered or abutted against mutually. When the movable arm 92 is abutted against the fixed arm 91, the rope or the cable buckle is clamped inside the suspension structure. The fixed axis 94 is defined on an inner sidewall of the notch 13, the movable arm 92 is provided with a rotational hole 921 which is matched with the fixed axis 94, the movable arm 92 is installed in the fixed axis 94 through the rotational hole 921 to release a flexible connection. One end of the elastic piece 93 connected to the housing 1 while the other end of the elastic piece 93 is connected to the movable arm 92. Preferably, the elastic piece 93 is a torsion spring; one end of the torsion spring is fixed on the housing 1, and the other end of the torsion spring is fixed on the movable arm 92. By applying the above suspension structure, the electronic cigarette charger is more convenient to be carried.

Figure 9:
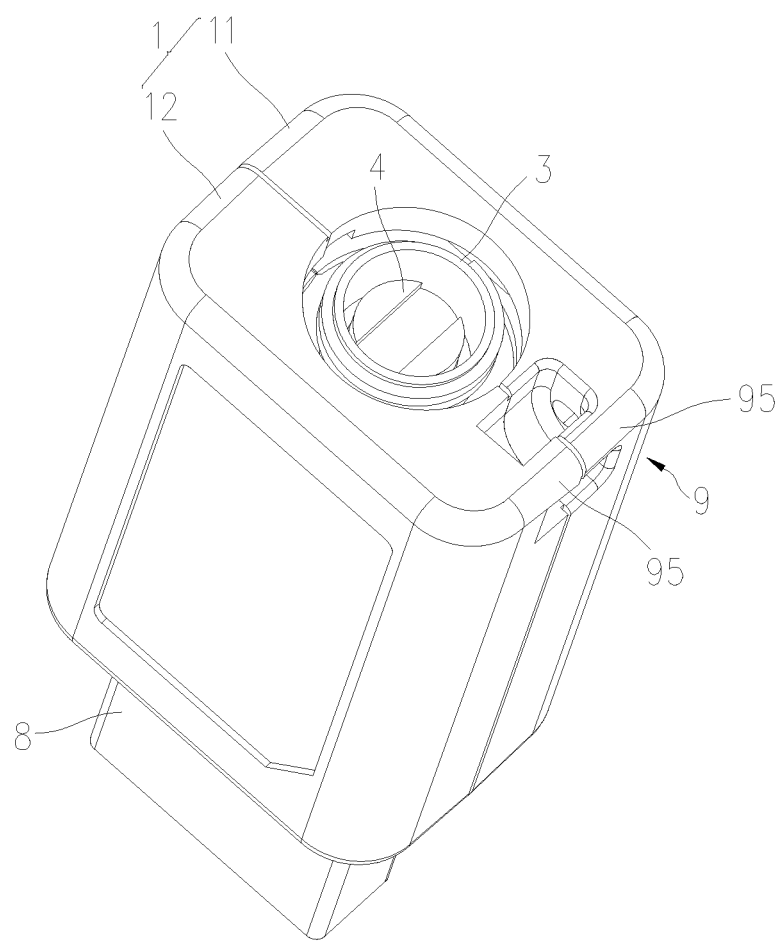
FIG. 9 is a structural schematic view of an electronic cigarette charger provided in a third preferred embodiment of the present application.

As shown in FIG. 9, a third preferred embodiment of the present invention is provided with an electronic cigarette charger, a difference from the electronic cigarette charger which is provided by the second preferred embodiment is the switching mechanism 9. In the present embodiment, the switching mechanism 9 comprises two elastic arms 95, the elastic arms 95 are roughly a long strip structures with well elasticity. Two of the elastic arms 95 are defined at the edge of the notch 13, and can be staggered by pressing ends of the elastic arms 95, thereby facilitating the rope or the cable buckle to pass through the suspension structure, when the elastic arms 95 are loosened, the elastic arms 95 are automatically reset so that two of the elastic arms 95 are mutually abutted against each other, and the rope or the cable buckle are held in the suspension structure. By implementing the above structures of the elastic arms 95, same beneficial effects of the second preferred embodiment can be realized, and compared with the second preferred embodiment, the switching mechanism 9 of the present embodiment is simpler.

While the embodiments of the present application are described with reference to the accompanying drawings above, the present application is not limited to the above-mentioned specific implementations. In fact, the above-mentioned specific implementations are intended to be exemplary not to be limiting. In the inspiration of the present application, those ordinary skills in the art can also make many modifications without breaking away from the subject of the present application and the protection scope of the claims. All these modifications belong to the protection of the present application.

The invention claimed is:

1. An electronic cigarette charger, comprising a housing (1), a charging circuit board (2) installed in the housing (1), a first electric connecting piece (3) and a second electric connecting piece (4) respectively and electrically connected to the charging circuit board (2) and used for electrically connecting to an electronic cigarette; wherein the electronic cigarette charger further comprises a first elastic metal wire (5), a second elastic metal wire (6), and a suspension structure arranged on the housing (1) and used for suspending the electronic cigarette charger;
wherein one end of the first elastic metal wire (5) is detachably connected to the charging circuit board (2) in an insertion mode, and the other end of the first elastic metal wire (5) is connected to the first electric connecting piece (3) in an elastic buckling mode; and one end of the second elastic metal wire (6) is connected to the charging circuit board (2) in an insertion mode, and the other end of the second elastic metal wire (6) is connected to the second electric connecting piece (4) in an elastic buckling mode.

2. The electronic cigarette charger according to claim 1, wherein an annular groove (31) is arranged on a peripheral surface of the first electric connecting piece (3); one end of the first elastic metal wire (5) which is opposite to the charging circuit board (2) is provided with a first buckling part (51) being arranged on and extended around the annular groove (31) and being in an arc shape, the first buckling part (51) is buckled inside the annular groove (31) and is clamped on an inner wall of the annular groove (31).

3. The electronic cigarette charger according to claim 1, wherein a limiting part (42) in a convex shape is arranged at one end of the second electric connecting piece (4) which is close to the charging circuit board (2); the second elastic metal wire (6) is provided with a second buckling part (61) in a U shape; the second buckling part (61) is clamped on a circumferential surface of the second electric connecting piece (4) and is abutted against the limiting part (42), an end of the second buckling part (61) is detachably connected to the charging circuit board (2) in an insertion mode.

4. The electronic cigarette charger according to claim 1, wherein the suspension structure is provided as either one of a suspension hole (10), a hook or a hanging ring which is arranged on the housing (1).

5. The electronic cigarette charger according to claim 4, wherein the suspension hole (10) is arranged at an end of the housing (1) which is close to the first electric connecting piece (3).

6. The electronic cigarette charger according to claim 4, wherein the suspension hole (10) is a through hole, and two adjacent side surfaces of the housing (1) are penetrated through by the suspension hole (10).

7. The electronic cigarette charger according to claim 1, wherein a notch (13) is defined at an edge of an end of the housing (1); an edge of the notch (13) is provided with a switching mechanism (9); the notch (13) and the switching mechanism (9) constitute the suspension structure.

8. The electronic cigarette charger according to claim 7, wherein the switching mechanism (9) comprises a fixed arm (91) fixedly defined at the edge of the notch (13), a movable arm (92) rotationally mounted at the edge of the notch (13), and an elastic piece (93) connected between the movable arm (92) and the housing (1); the fixed arm (91) and the movable arm (92) can be staggered mutually or abutted against each other.

9. The electronic cigarette charger according to claim 8, wherein the elastic piece (93) is a torsion spring; one end of the torsion spring is fixed on the housing (1), and the other end of the torsion spring is fixed on the movable arm (92).

10. The electronic cigarette charger according to claim 7, wherein the switching mechanism (9) comprises two elastic arms (95) which can be staggered mutually or abutted against each other; the elastic arms (95) are defined at the edge of the notch (13).

11. The electronic cigarette charger according to claim 1, wherein the first electric connecting piece (3) is sleeved outside the second electric connecting piece (4).

12. The electronic cigarette charger according to claim 11, wherein an end surface of the second electric connecting piece (4) which is opposite to the charging circuit board (2) is provided with a vent groove (41).

13. The electronic cigarette charger according to claim 11, wherein the first electric connecting piece (3) is an external threaded piece which is used for connecting to the electronic cigarette by a screw mode.

14. The electronic cigarette charger according to claim 11, wherein the electronic cigarette charger further comprises an insulation piece (7) which is sleeved between the first electric connecting piece (3) and the second electric connecting piece (4).

15. The electronic cigarette charger according to claim 1, wherein the housing (1) comprises a first housing (11) and a second housing (12) which are detachably connected to each other; the charging circuit board (2) is defined in an accommodation space which is formed by the first housing (11) and the second housing (12).

16. The electronic cigarette charger according to claim 15, wherein a buckling arm (111) is convexly defined at a side edge of the first housing (11); a buckling groove (121) connected with the buckling arm (111) in a buckling mode is defined at a side edge of the second housing (12).

17. The electronic cigarette charger according to claim 1, wherein the electronic cigarette charger further comprises a charging plug (8) connected with the charging circuit board (2) and used for electrically connecting to an electrical power; the charging plug (8) is a USB charging plug.

18. The electronic cigarette charger according to claim 17, wherein the USB charging plug and the first electric connecting piece (3) are respectively connected to two opposite ends of the charging circuit board (2).

19. The electronic cigarette charger according to claim 1, wherein the suspension structure is a suspension hole (10) which is arranged on the housing (1); the suspension hole (10) is arranged at an end of the housing (1) which is close to the first electric connecting piece (3), the suspension hole (10) is a through hole, and two adjacent side surfaces of the housing (1) are penetrated through by the suspension hole (10);
an annular groove (31) is arranged on a peripheral surface of the first electric connecting piece (3); one end of the first elastic metal wire (5) which is opposite to the charging circuit board (2) is provided with a first buckling part (51) being arranged on and extended around the annular groove (31) and being in an arc shape, the first buckling part (51) is buckled inside the annular groove (31) and is clamped on an inner wall of the annular groove (31);
a limiting part (42) in a convex shape is arranged at one end of the second electric connecting piece (4) which is close to the charging circuit board (2); the second elastic metal wire (6) is provided with a second buckling part (61) in a U shape; the second buckling part (61) is clamped on a circumferential surface of the second electric connecting piece (4) and is abutted against the limiting part (42), an end of the second buckling part (61) is detachably connected to the charging circuit board (2) in an insertion mode.

* * * * *